United States Patent
Barrett et al.

(10) Patent No.: US 7,756,128 B2
(45) Date of Patent: Jul. 13, 2010

(54) SYSTEM AND METHOD FOR NETWORK ANALYSIS

(75) Inventors: Edward E. Barrett, Fairfax, VA (US); Kirby Files, Milton, MA (US); Ron Haberman, Cupertino, CA (US); Shawn Edmondson, Holly Springs, NC (US)

(73) Assignee: Masergy Communications, Inc., Plano, TX (US)

( * ) Notice: Subject to any disclaimer, the term of this patent is extended or adjusted under 35 U.S.C. 154(b) by 949 days.

(21) Appl. No.: 11/540,165

(22) Filed: Sep. 29, 2006

(65) Prior Publication Data

US 2008/0080495 A1    Apr. 3, 2008

(51) Int. Cl.
*H04L 12/28* (2006.01)
*G06F 15/16* (2006.01)

(52) U.S. Cl. .................. 370/389; 709/231
(58) Field of Classification Search .......... None
See application file for complete search history.

(56) References Cited

U.S. PATENT DOCUMENTS

| | | | |
|---|---|---|---|
| 6,751,459 B1 * | 6/2004 | Lee et al. ............... 455/445 |
| 7,020,082 B2 * | 3/2006 | Bhagavath et al. ........ 370/230 |
| 2002/0168055 A1 * | 11/2002 | Crockett et al. .......... 379/88.01 |
| 2004/0010473 A1 * | 1/2004 | Hsu et al. .................. 705/77 |
| 2004/0017898 A1 * | 1/2004 | Reynolds ................. 379/88.18 |
| 2004/0170176 A1 * | 9/2004 | Kadambi et al. ........... 370/392 |
| 2006/0045067 A1 * | 3/2006 | Dezonno et al. .......... 370/352 |
| 2006/0233101 A1 * | 10/2006 | Luft et al. ................ 370/229 |
| 2007/0008884 A1 * | 1/2007 | Tang ...................... 370/230 |
| 2007/0237080 A1 * | 10/2007 | Savagaonkar ............. 370/235 |

* cited by examiner

*Primary Examiner*—Hong Cho
*Assistant Examiner*—Eunsook Choi
(74) *Attorney, Agent, or Firm*—Sonnenschein Nath & Rosenthal LLP

(57) ABSTRACT

A method of evaluating the performance of a network at an edge device of a provider network includes receiving a plurality of packets associated with a plurality of customers and copying the header information for each of the plurality of packets. The method also includes identifying one of the plurality of customers for each of the plurality of packets and storing the header information for each of the plurality of packets in a database associated with the identified customer.

18 Claims, 4 Drawing Sheets

SYSTEM AND METHOD FOR NETWORK ANALYSIS

BACKGROUND

The invention relates to telecommunications, and in particular, to a system and method of network analysis. Current systems and methods for collecting network data in order to analyze the performance of a network utilize software and equipment at a customer premises to capture packets entering and leaving a customer site. Certain embodiments of the present invention resolve certain disadvantages of such systems and methods as further described relative to FIG. 1 of the following detailed description.

SUMMARY

In accordance with the present invention, a system and method for network analysis is disclosed that offers improvements over prior systems and methods.

In one embodiment of the present invention, a method of evaluating the performance of a network at an edge device of a provider network is disclosed that includes receiving a plurality of packets associated with a plurality of customers and copying the header information for each of the plurality of packets. The method also includes identifying one of the plurality of customers for each of the plurality of packets and storing the header information for each of the plurality of packets in a database associated with the identified customer.

In another embodiment of the present invention, a system for evaluating the communication on customer information for a provider network includes an edge device operable to receive a plurality of packets associated with a plurality of customers. The system also includes a packet capture application in communication with the edge device and operable to copy the header information for each of the plurality of packets. The system also includes a mapping application in communication with the packet capture application and operable to identify one of the plurality of customers for each of the plurality of packets. The system further includes a memory in communication with the mapping application and operable to store the header information for each of the plurality of packets, the memory including data files associated with each of the identified customers.

BRIEF DESCRIPTION OF THE INVENTION

DETAILED DESCRIPTION OF THE INVENTION

Figure 1:
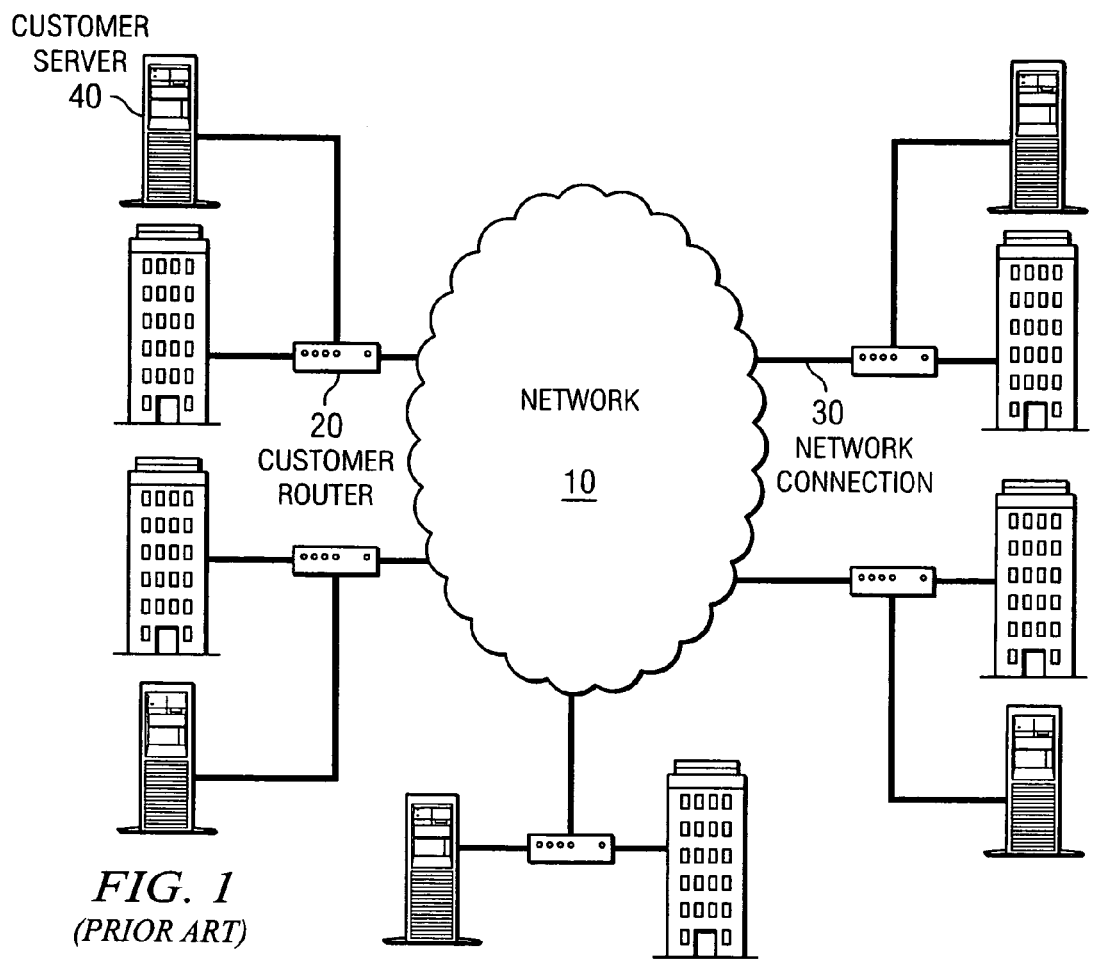
FIG. 1 illustrates a prior art figure of a network of a service provider.

FIG. 1 illustrates a prior art figure wherein a network 10 of a service provider is utilized to provide connectivity to various customer site that include a customer router 20 and a customer server 40. Customer router 20 routes network traffic between the customer site and network 10 along network connection 30. Although the nomenclature of a customer or customer site will be used throughout this application, it should be understood that each customer site is not necessarily a separate corporate entity and may each be only branch offices of a customer in or different locations or customer sites across a geographic region. In the prior art network configuration utilized in FIG. 1, data regarding network traffic that is communicated between customer router 20 and network 10 is collected at a customer site by customer router 20 or a separate network device or appliance that mirrors packets communicated into the customer site as they pass through customer router 20. The terms sniff, mirror, and capture will be used throughout this application to denote the copying of data included in a packet or other group of data or in the header of such packet or group.

Data collected from network traffic, which may be in the form of packets or Ethernet frames, are then be analyzed by customer router 20 itself or a separate network or computing device, with the results of such analysis stored at the customer site on customer server 40 or other device. Thus, the customer ensures that all traffic to and from that customer site that passes through customer router 20 may be copied for purposes of network monitoring, the evaluation of network performance, use in network security, or any other suitable purpose.

Despite such advantage, the network configuration utilized in the prior art illustrated by FIG. 1 may require that the customer maintains on the customer site a special router or such other customer site equipment that is capable of mirroring packet data. Such configuration may further require collecting network data in a separate customer server that may be separately purchased for such specific purpose. Such configuration may also require the customer to install special agents and other software at the customer site increasing both cost and network complexity at the customer site. Further, in a geographically distributed enterprise, each separate customer site may require any or all of such components. Additionally, the customer must also typically purchase and install reporting software on customer server 40 or some other device that allows customer to review and analyze network performance information.

Monitoring network performance through the mirroring of packets on a customer site may also result in an increase in bandwidth that is consumed on a local customer network or otherwise result in an additional strain on the processing resources of the customer. Further, the prior art network configuration illustrated in FIG. 1 may collect data separately for each customer site of a large enterprise customer, and may not easily allow for the analysis of network performance data in the aggregate for enterprises that may have many different customer site distributed across a wide geographic area. While such data may be communicated through customer routers similar to other network data can, any such aggregation of data from multiple customer sites may negatively impact the bandwidth available to that particular customer.

The configuration of FIG. 1 may also have additional disadvantages for customers wherein large customer enterprises may find it difficult to scale the collection and evaluation of network performance data across a large network There may also be considerable additional time and IT resources that are required to maintain and monitor such network performance data using such a network configuration. Finally, such a network configuration may increase the latency of data communicated to and from a customer site given the extra bandwidth and processing resources that may be required at a customer site and network Some of the disadvantages of the configuration of a network illustrated in FIG. 1 may be addressed by certain embodiments of the present invention. However, the scope of the present invention is not limited to systems and methods addressing the preceding disadvantages.

Figure 2:
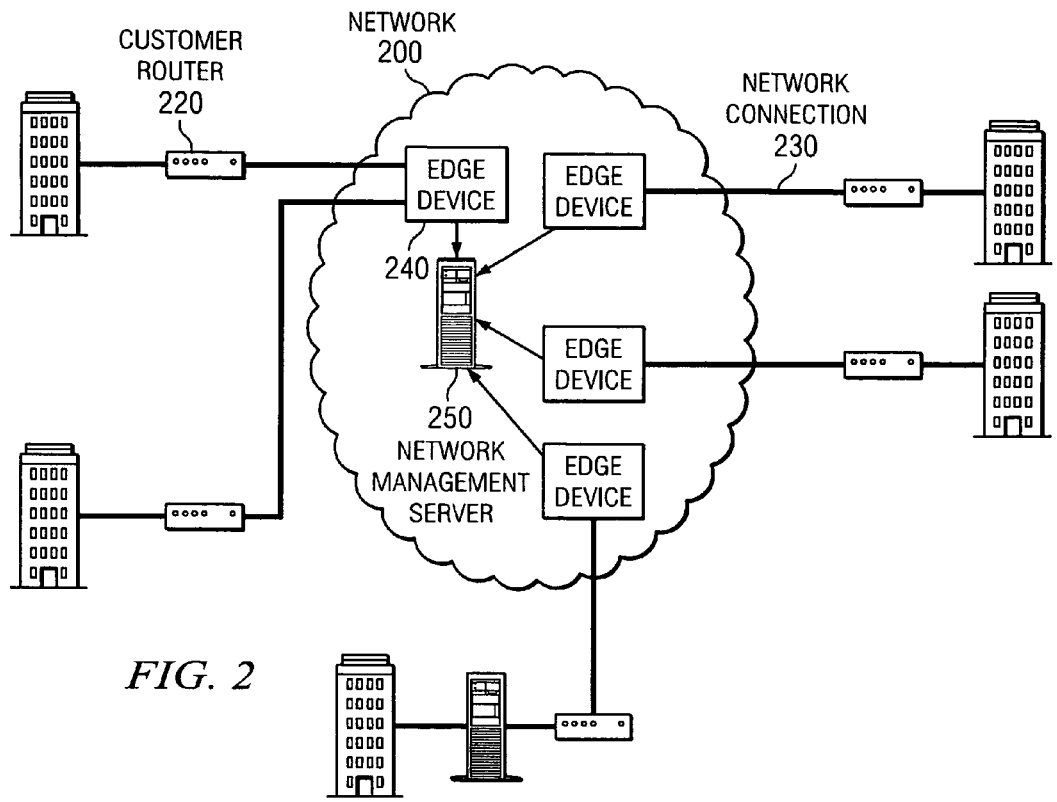
FIG. 2 illustrates one embodiment of a configuration of a network implemented according to teachings of the present invention.

FIG. 2 illustrates one embodiment of a configuration of a network implemented according to teachings of the present invention. FIG. 2 illustrates a network 210 used to communicate data between a plurality of customer sites. A customer site shall be defined for purposes of this application as any location of an individual entity, department, group, or other collection of computers or individuals that utilize services provided over network 210. More particularly, a customer router 220 located at a customer site communicates data to and from an edge device 240 of network 210 over a network connection 230. Edge device 240 may be connected to many different customer routers 220 such that edge device 240 is used by multiple customers or multiple customer sites to access network 210.

In one embodiment, network 210 is a core network of a provider of network services contracted by customers to provide network services to different customers or customer sites. Alternatively, network 210 and the entire network configuration illustrated in FIG. 2 may be a single enterprise customer that maintains and operates its own network. In such an embodiment, each customer site may be different office buildings, office complexes, sites of branch offices, divisions, or other organizations within a single enterprise.

Customer router 220 is a network device that receives network data from network 210 over network 230 and routes that data to the appropriate location within the customer's local area network or other network located at the customer site. Although such network device is illustrated as customer router 220, it should be understood that customer router 220 may be representative of any single network router, switch, bridge, hub, or any other network device or any combination of the foregoing that are suitable for allowing a customer to access network 210.

Similarly, edge device 240 is a network device within network 210. Edge device 240 receives data communicated from one or more customer sites and switches, routes, or otherwise forwards such data to an appropriate location through network 210. In one embodiment, edge device 240 is an edge switch that aggregates data from a plurality of customer routers. However, edge device 240 can be an edge router or any other suitable network device providing an access point to network 210 for customer router 240.

Network management server 250 is a server connected to one or more edge devices 240 and is utilized to collect and store data associated with the performance of network 210 or the connection between network 210 and customer router 220. Network management server may be any suitable combination of hardware and software capable of storing network performance data. Network management server 250 may be a single device or a combination of separate devices. In one embodiment, network management server 250 is directly connected to one or more edge devices 250 and does not utilize network 210 to communicate data between network management server 250 and edge device 240. In such an embodiment, the communication of network performance data from edge device 240 to network management server 250 does not consume any bandwidth of network 210.

In operation, unlike the network configuration illustrated in FIG. 1, no packets are required to be mirrored as they pass through customer router 220. As a result, no network performance data needs to be stored at a customer site and no bandwidth of a customer network needs to be utilized to communicate network performance data for storage or analysis. Instead, packets are mirrored at each edge device 240 as customer data enters network 210. As previously described, a single edge device 240 may serve as a access point to network 210 for more than one customer or more than one customer site. As a result, network performance data for a plurality of customers may be collected at a single edge device 240.

In practice, packets or frames of data may be captured and header information from such packets or frames copied for later evaluation and analysis. Such data may be temporarily stored at edge device 240 or a separate network device in communication with edge device 240, or may be immediately communicated over a link to network management server 250. In one embodiment, network performance data such as header information is stored at edge device 240 and later communicated network management server 250 at predetermined intervals. For example, edge device 240 may communicate header information at thirty second intervals to network management server 250.

In one embodiment, edge device 240 may communicate network performance information to two different locations or two different network management servers 250 based on the type of data included in such header information. For example, information useful to network security may be sent to a first network management server 250 while information suitable to evaluate network performance may be sent to a separate network management server 250.

Network performance information such as header information may be stored by network management server 250 in one more databases for later review and analysis. For example, network management server 250 may have a different database for each customer utilizing network 210, or alternatively each customer site connected to network 210. An end-user of network management server 250 such as a network administrator of network 210 or a member of a particular customer's IT department may access the information stored on server 250 in a variety of different ways. For example, network management server 250 may also be a web server such that individuals may access the data stored thereon via a website available over an intranet or the internet. Alternatively, network management server 250 may have a local client or user interface suitable for accessing and analyzing data stored on network management server 250. Reports may be generated, stored, and presented based on any combination of variables associated with data stored on network management server 250.

Figure 3:
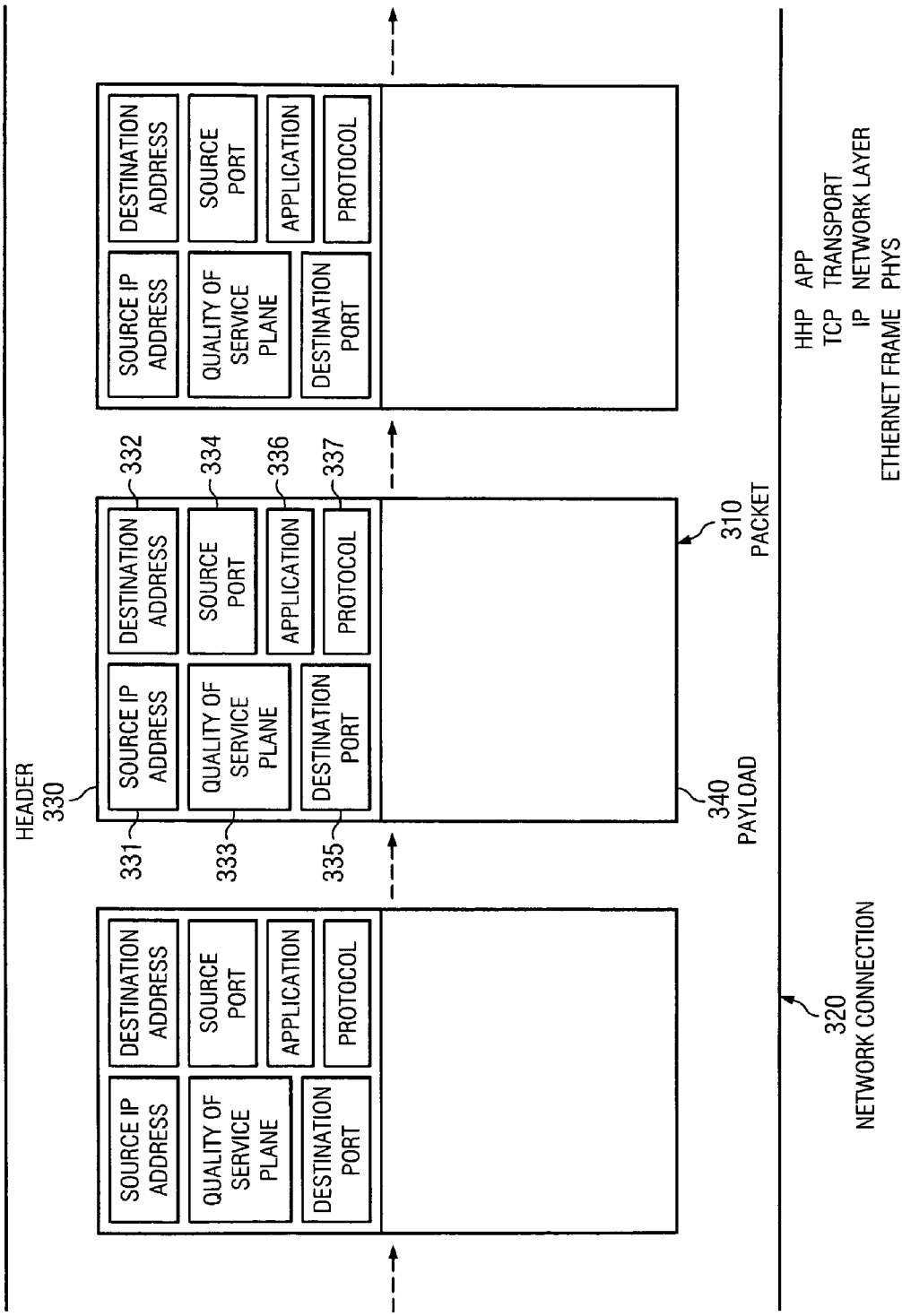
FIG. 3 illustrates one embodiment of a packet from which network performance data may be obtained according to the teachings of the present invention.

FIG. 3 illustrates one embodiment of a packet 310 from which network performance data may be obtained according to the teachings of the present invention. Although packet 310 is illustrated as a packet, it should be understood that packet 310 may instead be a frame, slot, circuit, cell, or other group of data. In one embodiment, packet 310 is an internet protocol (IP) packet embedded in an Ethernet frame. Packet 310 is communicated along network connection 320 and includes a header 330 and a payload 340.

The terms header 330 and payload 340 are relative terms. A header 330 may be any portion of packet 310 that includes information describing or used to communicate data included in the packet. For example, header information may be utilized to route packet 310 through a network Likewise, payload 340 may be any data communicated by an application over a network. In many networks, packets such as packet 310 maybe encapsulated within other packets which may in turn be encapsulated in yet other packets. Thus, an HTTP packet may be encapsulated in a TCP packet, which may in turn be encapsulated in an IP packet, which may in turn be encapsulated in an Ethernet frame. As a result, for purposes of this application, the term header is used to refer to that portion of a packet that forms the header of any encapsulation layer within such packet. Thus, to evaluate network performance, information may be collected from different headers from each of the various layers in which a packet is encapsulated.

Header 330 is illustrated as including a source IP address 331, a destination IP address 332, a quality of service (QoS) plane 333, a source port 334, a designation port 335, an application 336, and a protocol 337. The illustration of such portions of header 330 is not intended to limit the scope of information from header 330 that is useful for network performance to the illustrated pieces of information. Rather, the illustrated portions of header 330 are provided as notable examples of information relevant to the evaluation of network performance.

In operation, according to the teachings of the present invention, a packet 310 may be copied in order to extract information found within header 330 for later storage and analysis. In such a manner, a customer or network administrator may sort, analyze, and present information regarding data communicated over a network sorted according to any of the information included in a header 330.

Figure 4:
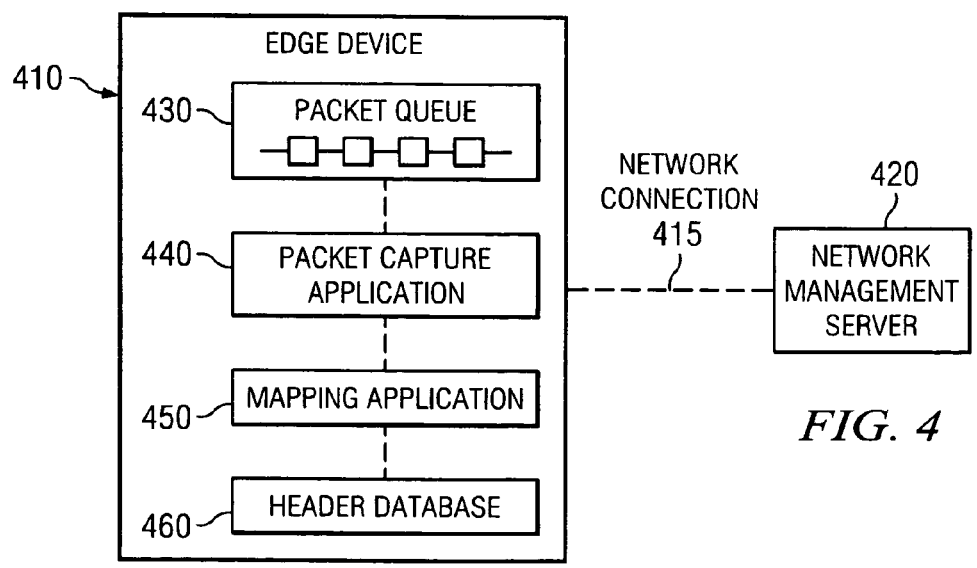
FIG. 4 illustrates one embodiment of an edge device 410 implemented according to the teachings of the present invention.

FIG. 4 illustrates one embodiment of an edge device 410 implemented according to the teachings of the present invention. Edge device 410 is connected through a network connection 415 to a network management server 420. Edge device 410 includes a packet queue 430, a packet capture application 440, a mapping application 450, and a header database 460.

Packet queue 430 is any queue or buffer wherein packets are temporarily stored as they enter edge device 410 from the network or from a connection to a customer site. Packet capture application 440 copies incoming data packets as they are queued in packet queue 430. Packet capture application 440 may utilize a raw socket interface to an Ethernet interface to a connection to a customer site. In one embodiment, packet capture application 440 includes the Linux® PACKET_MMAP facility. Packet capture application 440 may be capable of simultaneously collecting data for all customer network connections accessing edge device 410.

Although mapping application 450 is illustrated as a separate component to packet capture application 440, both capture and mapping functions may be performed by a single application. Mapping application 450 maps incoming packets to edge device 410 into header database 460 based on information included in the header portion of such packets. For example, packets may be mapped into portions of header database 460 based on the customer associated with such packets. For example, in certain networks there may be a customer I.D. number included in a packet header. Alternatively, no such customer I.D. number may exist, but another identifier such as a VLAN circuit number or IP address that is known to be associated with a particular customer may be utilized to identify an associated customer.

In one embodiment, the wire format for the packet queue is 802.1q Ethernet VLAN tagging. In such embodiment, each customer site's data may be transmitted encapsulated with a different VLAN ID. In another embodiment, the wire format for the packet queue may be Multi Protocol Label Switching (MPLS). In this other embodiment, the native packet frame type is indicated by the outer label in the Label Switched Path (LSP) label stack; the customer site identifier is indicated by the inner label of the LSP label stack. Such information may be utilized to determine a customer with which particular data is associated.

Mapping application 450 may utilize in-memory table mapping to map incoming packets to particular portions of memory, sometimes referred to as "buckets" for sorting and storage. Packet capture application 440, mapping application 450, or any other suitable portion of edge device 410 may also store packet counts and byte counts for edge device 410 as a whole, for each customer, or based on any other information included in a header of a packet. In such a manner, packet and byte counts may be collected for a particular source or a destination IP address, source or a destination port number, application, quality of service plane, protocol, or any other suitable category.

In one embodiment, network connection 415 is a gigabit Ethernet connection. However, network connection 415 may be any other suitable connection between edge device 410 and network management server 420, whether on-network or off-network Alternatively, edge device 410 and network management server maybe a single integrated device or separate devices located at the same facility or network node.

Figure 5:
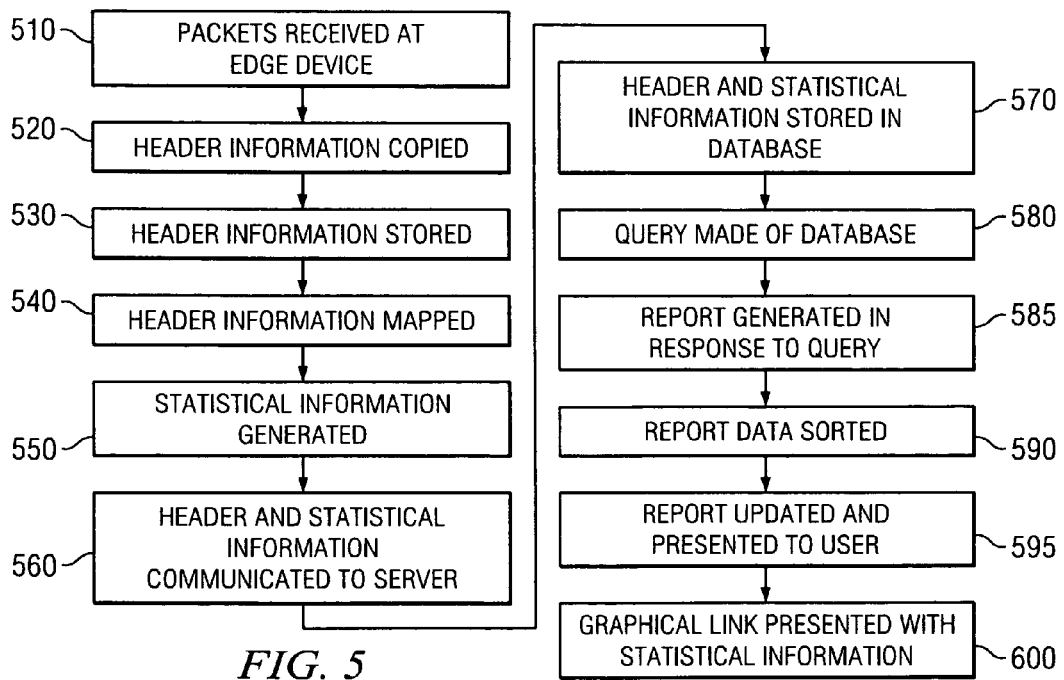
FIG. 5 illustrates one embodiment of a method of collecting network performance data according to the teachings of the present invention.

FIG. 5 illustrates one embodiment of a method of collecting network performance data according to the teachings of the present invention. In step 510, packets are received at an edge device of a network from a plurality of customers. In step 520, the header information for each of the packets is copied. In step 530, the header information is stored. In step 540, alternatively or in addition to step 530, the header information is mapped into memory based on an identifier associated with the customer communicating or receiving each particular packet. Header information may include information such as source address, destination address, transport protocol source port, destination port, application, protocol, quality of service plane, or any other suitable information capable of being derived from the header of a packet in a network In step 550, statistical information such as byte count, packet count, packet loss, bandwidth utilized, latency, or any other suitable performance information is generated. Statistical information shall be defined for purposes of this application as any information calculated or derived from any header information, either alone or in combination with other information, as opposed to raw header information itself.

In step 560, header information and statistical information are communicated over a network distribution layer or other connection to a server. In step 570, the header information and the statistical information are stored in a database or otherwise in the memory of the server. Alternatively, step 550 may take place at a server after header information is communicated to a server with statistical information being generated at the server after such communication. In step 580, a query may be made of the database with regard to a particular customer, a particular protocol, a particular application, a particular source IP address, a particular destination IP address, a particular network direction, a particular start and stop time, or any combination of the foregoing. In step 585, a report is generated in response to such query. The report may include the presentation of header information or statistical information associated with a network in any suitable format. In step 590, a request is received to sort the data presented in such report according to one or more parameters. In step 595, the sorted report is updated and presented to the user. In step 600, a graphical presentation of at least one network link is presented along with the statistical information regarding the flow of data across such network connection.

Figure 6:
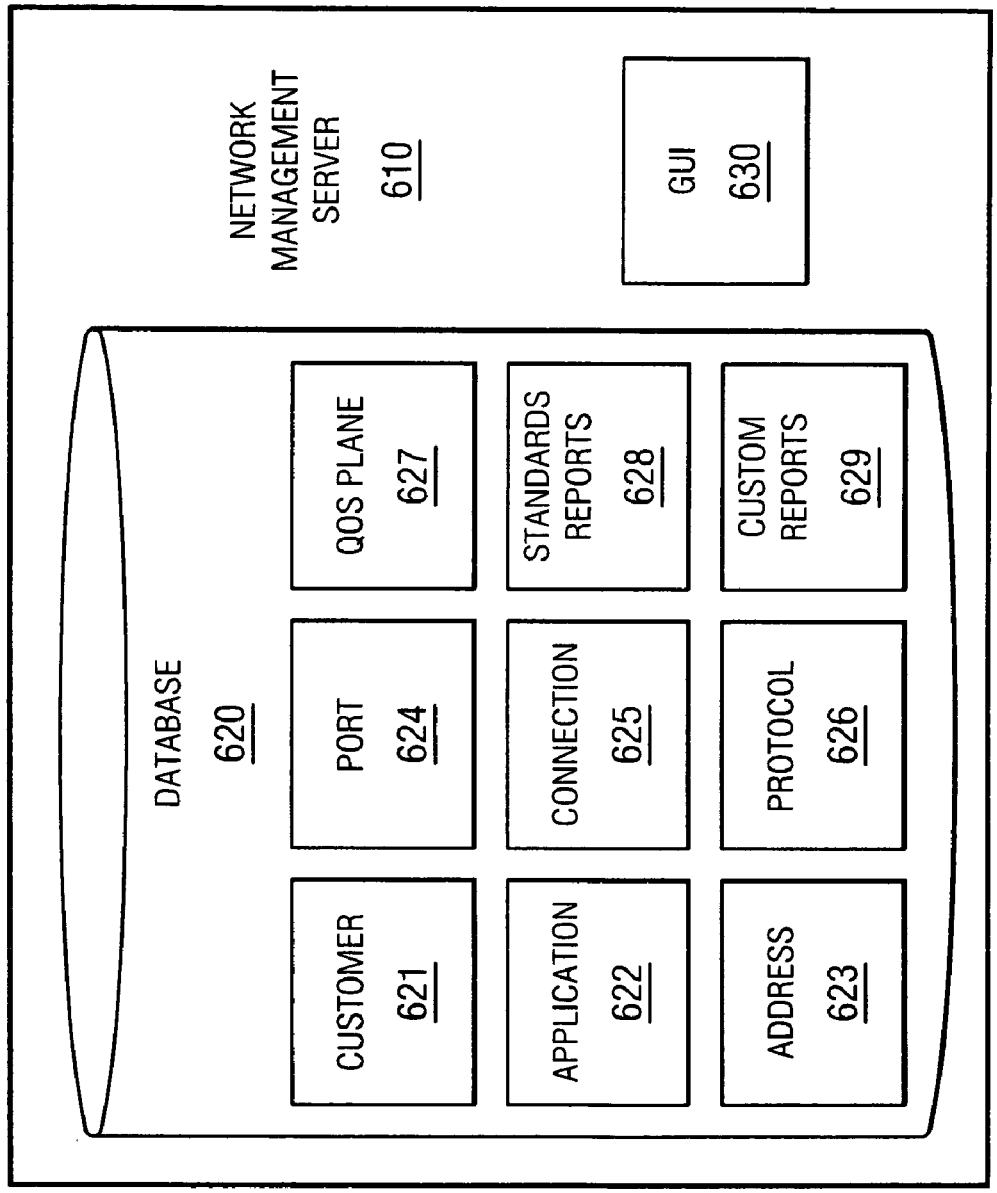
FIG. 6 illustrates one embodiment of a network management server implemented according to the teaching of the present invention.

FIG. 6 illustrates one embodiment of a network management server 610 implemented according to the teachings of the present invention. Network management server 610 includes a database 620 and a graphical user interface (GUI) 630. Database 620 is a database used to store information regarding the performance of the network such as statistical information and header information. Database 620 may include customer records 621, application records 622, address records 623, port records 624, connection records 625, protocol records 626, QoS plane records 627, standard reports 628, and custom reports 629.

Each of records 621 through 629 maybe separate standalone databases, records, files, or sub files of database 620, or may not be separately addressed memory locations at all, but may instead only represent the ability of the data within database 620 to be sorted based on customer, application, address, port, connection, protocol, QoS plane, or any other type of data stored by database 620. For example, database 620 may be a database that includes entries associated with each individual packet received over a network In such example, the entries of database 620 may be separated into different fields, with each field representing a different piece of header information associated with the packet associated with the entry. In such a manner, packet data can be sorted by any of such fields, such as by customer, by IP address, by destination port, by application, or any other suitable parameter.

It should be noted that database 620 may include additional fields for files associated with information other than the specific information illustrated in FIG. 6. For example, database 620 may include fields associated with every piece of information found in any header of any packet communicated over a network.

Each of records 621 through 627 may also include information associated with a group of packets. For example, each of records 621 through 627 may include statistical information regarding some or all of the packets that are associated with a particular customer, application, or other suitable piece of header information. Such summary or statistical information may include packet counts, byte counts, latency, bandwidth utilized, bandwidth available, peak traffic time periods, or any other suitable information regarding network performance.

Database 620 may also include portions for storing standard report 628 and custom report 629. Such standard report 628 may include reports that are pre-generated and available for any administrator or customer's use to monitor the performance of a network For example, standard report 628 may allow a user to enter a query associated with a source IP address, a destination IP address, a start time, and a stop time. Standard report 628 may then generate both summary and individual packet information associated with all network connections between such IP addresses during the interval of time defined by the start time and the stop time. For example, such report could include information such as the total bytes communicated between each of such IP addresses, the total amount of packets communicated between each of such IP addresses, the applications communicating data between each of such IP addresses, or the percentage use of the total available bandwidth of the connection between each of such IP addresses.

Standard report 628 may also include a list of header information associated with each packet of data communicated between each IP address. Standard report 628 maybe further detailed to include the direction of data communicated between each of two such IP addresses. For example, standard report 628 may have a top portion indicating information communicated from IP address A to IP address B and a bottom portion associated with data communicated from IP address B to IP address A.

While the standard reports 628 that are preconfigured and stored on database 620 may account for a large variety of information, reports, and analysis suitable for many network administrators and customers of a provider of a network, certain individuals may want to generate custom reports that include information specific to such individual's network concerns. As a result, custom report 629 may be generated by a customer and stored for later use by such customer to allow the customer to access a wide variety of network information based on any combination of header information or statistical information associated with such header information that are stored by database 620.

Standard report 628 and custom report 629 may include text, graphics, charts, graphs, representations of network connections, network datagrams, customer enterprise diagrams, any other suitable data in any suitable format, or any combination of the foregoing. More particularly, statistical information associated with a particular customer link may be presented in textual form above a graphical representation of that network link For example, information regarding the connection between a customer site in Santa Fe, N. Mex. and a customer site in New York, N.Y. may be illustrated. Along with a graphical presentation of the links comprising such a connection, information may be presented that categorizes customer network data communicated over each such link based on application, quality of service plane, protocol port addresses, or any other suitable information.

As previously described, network management server 610 may itself be a web server or may otherwise be in communication with a web server such that all of the information of database 620 may be presented over a network to any client that establishes a communication with network management server 610. As a result, network management server 610 also includes GUI 630 that may include code for generating a graphical textual, or other suitable user interface suitable for allowing a user to select specific reports, generate or customize reports, submit queries to database 620, view reports generated as a result of such queries, or sort and manipulate the data in such reports to present the information in a format useful to a user of network management server 610.

Although particular embodiments of the present invention have been explained in detail it should be understood that various changes, substitutions, and alterations can be made to such embodiments without departing from the spirit and scope of the present invention as defined solely by the following claims.

The invention claimed is:

1. A method of evaluating the performance of a network at an edge device of a provider network, the method comprising:
    receiving a plurality of packets associated with a plurality of customers;
    copying the header information for each of the plurality of packets;
    identifying one of the plurality of customers for each of the plurality of packets;
    storing the header information for each of the plurality of packets in a database associated with the identified customer;

generating statistical information in response to the stored header information, the statistical information being associated with an application associated with the identified customer; and storing the header information and the statistical information in a second database associated with the identified customer and the application, wherein storing the header information and the statistical information further comprises storing the header information and the statistical information in at least one file associated with each network connection.

2. The method of claim 1, wherein copying the header information includes mirroring the plurality of packets using a raw socket interface to an Ethernet interface, the raw socket interface using a packet capture application.

3. The method of claim 1, wherein storing the header information includes mapping the header information for each of the plurality packets into the database associated with the identified customer.

4. The method of claim 1, and further comprising determining a packet count that is associated with each source address, destination address, transport protocol, source port, and destination port included in the stored header information, the packet count being determined for a particular interval of time.

5. The method of claim 1, and further comprising determining a byte count that is associated with each source address, destination address, transport protocol, source port, and destination port included in the stored header information, the byte count being determined for a particular interval of time.

6. The method of claim 1, wherein the stored header information is forwarded to a second database associated with the network at regular intervals, the stored header information being forwarded using a network distribution layer.

7. The method of claim 1, wherein the stored header information is forwarded in further packets over a network to a database, the stored header information being forwarded using check-summing of such further packets prior to and following the forwarding of the further packets to the database.

8. The method of claim 1, and further comprising generating statistical information in response to the stored header information.

9. The method of claim 1, and further comprising:

generating statistical information in response to the stored header information, the statistical information being associated with an application associated with the identified customer; and storing the header information and the statistical information in a further database associated with the identified customer and the application.

10. The method of claim 1, wherein storing the header information and the statistical information in at least one file associated with each network connection further includes storing the header information and the statistical information in at least one file associated with each direction of communication associated with the network connection.

11. The method of claim 10, and further comprising presenting network performance information in response to a query of the database including a start time and a stop time, the presented network performance information associated with an interval defined by the start time and the stop time.

12. The method of claim 10, and further comprising presenting a portion of the header information in response to a query of the database including a start time and a stop time, the portion of the header information being associated with packets communicated over the network connection during an interval defined by the start time and the stop time.

13. A system for evaluating the communication of customer information on a provider network, the system comprising:

an edge device operable to receive a plurality of packets associated with a plurality of customers;

a packet capture application in communication with the edge device and operable to copy the header information for each of the plurality of packets;

a mapping application in communication with the packet capture application and operable to identify one of the plurality of customers for each of the plurality of packets; and a memory in communication with the mapping application and operable to store the header information for each of the plurality of packets, the memory including data files associated with each of the identified customers, wherein statistical information is generated in response to the stored header information, the statistical information being associated with an application associated with the identified customer; and a database in communication with the network the database associated with the identified customer and the application, wherein the stored header information is communicated to the database from the memory, wherein the header information and the statistical information is stored in at least one file associated with each network connection.

14. The system of claim 13, wherein the data files including fields associated with each source address, destination address, transport protocol, source port, and destination port included in the stored header information.

15. The system of claim 13, wherein the database includes data associated with each of the identified customers.

16. The system of claim 13, wherein each file includes data associated with each application used by the identified customer.

17. The system of claim 16, wherein each subfile includes further data associated with each network connection used to communicate data for the application.

18. The system of claim 17, wherein each further subfile includes additional data associated with each direction of communication associated with the network connection.

* * * * *